United States Patent [19]

Hata et al.

[11] Patent Number: 4,467,170

[45] Date of Patent: Aug. 21, 1984

[54] ELECTRON BEAM DRILLING APPARATUS

[75] Inventors: Seiji Hata, Fujisawa; Takao Terabayashi, Yokohama; Noriyoshi Arakawa, Fujisawa; Makoto Watanabe, Matsudo, all of Japan

[73] Assignee: Hitachi, Ltd., Tokyo, Japan

[21] Appl. No.: 387,666

[22] Filed: Jun. 11, 1982

[30] Foreign Application Priority Data

Jun. 17, 1981 [JP] Japan .................. 56-92275

[51] Int. Cl.³ .............................. B23K 27/00
[52] U.S. Cl. .................. 219/121 EH; 219/121 EU; 219/121 EW; 219/121 EX
[58] Field of Search ............... 219/121 EH, 121 EJ, 219/121 EK, 121 EU, 121 EV, 121 ES, 121 EX, 121 EY, 121 EF, 121 EG

[56] References Cited

U.S. PATENT DOCUMENTS

| 3,404,254 | 10/1968 | Jones | 219/121 EJ |
| 3,644,700 | 2/1972 | Krupper et al. | 219/121 EW X |
| 3,894,271 | 7/1975 | Pfeiffer et al. | 219/121 EX X |
| 4,145,597 | 3/1979 | Yasuda | 219/121 EW X |
| 4,328,411 | 5/1982 | Haller et al. | 219/121 EH |

Primary Examiner—C. L. Albritton
Attorney, Agent, or Firm—Antonelli, Terry & Wands

[57] ABSTRACT

An electron beam drilling apparatus for drilling a number of holes in a substrate by an electron beam is disclosed. The holes are drilled at a high speed by scanning the electron beam along a direction perpendicular to the direction of movement of the workpiece while the workpiece is moved at a high speed. A drilling position error due to the high speed movement of the workpiece is corrected by controlling an electron beam deflection unit and an electron beam generator.

8 Claims, 4 Drawing Figures

ELECTRON BEAM DRILLING APPARATUS

BACKGROUND OF THE INVENTION

1. Field of the Invention

The present invention relates to a high speed and precision electron beam drilling apparatus for drilling holes in a substrate, especially a substrate for an electronic equipment which need a number of high density drilled holes.

2. Description of the Prior Art

In recent years, hard-to-work material such as refractory alloy or ceramics has been widely used. Such a material is hardly machined by a conventional method. For example, an LSI chip mounting substrate used in an electronic computer is made of an alumina plate of approximately 100 mm square in which approximately 40,000 small holes having a diameter of 0.1 mm–0.15 mm are arranged. Such small holes are mostly arranged without regularity and directivity. Such an alumina substrate is machined by drilling holes by a drill or an electron beam by positioning it to respective hole positions, or drilling uniformly distributed holes by a pressing mold and clogging undesired holes. In the former method, a speed and an acceleration/deceleration of a drive mechanism on which the substrate is mounted are limited and hence an operation speed is limited. Accordingly, when the number of holes to be drilled is large, a long time is required to machine each substrate. In the latter method, the manufacture of the mold is expensive and the clogging of the undesired holes needs a lot of tasks.

In general, in order to drill holes at a high speed with a various patterns, a system which can be positioned at a high speed and can drill holes at a high speed is needed. For this purpose, it is possible to fix the substrate and control deflection of a high energy electron beam to drill the holes. However, it is difficult to precisely control the deflection of the high energy electron beam over a wide range and it is not applicable to the drilling of the substrate of the electronic equipment in which the range of the drilling spreads relatively widely.

SUMMARY OF THE INVENTION

It is an object of the present invention to provide an electron beam drilling apparatus which drills a number of holes at a high speed by moving a substrate at a high speed with a mechanical method and deflecting an electron beam perpendicularly to the direction of the movement of the substrate within a range which allows to maintain a high machining precision.

In accordance with the present invention, the substrate is moved at a high speed by a drive mechanism and the electron beam is scanned perpendicularly to the direction of the movement of the substrate within a range which allows to maintain a high precision so that holes are drilled over a wide range. Thus, the drive mechanism need not be accelerated nor decelerated for positioning, and together with a high speed of the electron beam deflection the drilling is attained at a very high speed.

DESCRIPTION OF THE PREFERRED EMBODIMENT

Figure 1:
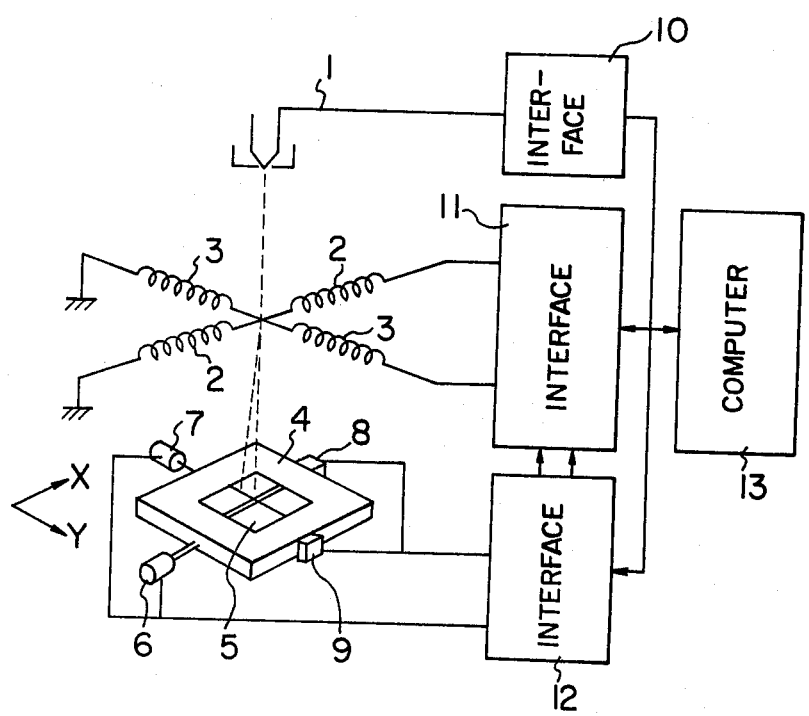
FIG. 1 shows a configuration of one embodiment of an electron beam drilling apparatus of the present invention.

FIG. 1 shows a configuration of one embodiment of the present invention. The present apparatus primarily comprises an X-Y table 4 on which a workpiece or a substrate 5 is mounted and which is driven in orthogonal directions X and Y at a high speed, servo motors 6 and 7 for driving the X-Y table in the X and Y directions, respectively, encoders 8 and 9 for sensing X and Y axis positions of the X-Y table 4, an electron beam generator 1 arranged to oppose the substrate 5 for generating an electron beam for drilling, and deflection coils 2 and 3 arranged intermediate the substrate 5 and the electron beam generator 1 for deflecting the electron beam emitted from the electron beam generator 1. The deflection coil 2 is an X-axis deflection coil for scanning the electron beam in the X direction while the X-Y table 4 is moved in the Y direction, and the deflection coil 3 is a Y-axis deflection coil for correcting a positional error of the X-Y table 4 due to the movement thereof along the Y direction.

An overall control of the present apparatus is effected by a control computer 13, which stores hole position data for the substrate 5 in the order of drilling and controls the drilling of the present apparatus through an electron beam generator interface 10 for controlling a pulse width of the drilling electron beam, an electron beam deflection interface 11 for controlling the scan of the electron beam and the correcting the positional error, and a servo system and encoder interface 12 for controlling the drive of servo motors 6 and 7 and signals from the encoders 8 and 9.

The encoders 8 and 9 are provided to determine the position and compensate the positional displacement due to the movement of the X-Y table 4. The control computer 13 effects the beam positioning by the deflection of the deflection coils 2 and 3 and decides the timing of the drilling. After the positioning, the control computer 13 supplies an electron beam generation signal to the electron beam generator 1 through the interface 10 to drill the holes in the substrate 5.

The drilling operation of the present apparatus is now explained. The present apparatus is characterized by the positioning in the drilling operation in which not only the X-Y table 4 carries out the positioning but also the positioning is effected by deflecting the electron beam emitted from the electron beam generator 1 if the deflection of the electron beam does not significantly affect the shape of the hole to be drilled. In the present apparatus, the allowable range of deflection is ±3 mm in both X and Y directions. A maximum drive speed of the X-Y table 4 is 100 mm/sec, and a deflection rate of the electron beam is 1 m/sec. In the present apparatus, positioning position of the X-Y table 4 is 1 μm in a command value and that of the electron beam deflection is no larger than several microns when changed, and a total precision is no larger than 10 microns.

In the drilling by the present apparatus, coordinate data of the holes are stored in the control computer 13 and the positioning is effected in the instructed order by the X-Y table 4 and the electron beam deflection function and the electron beam is generated in pulsive form to drill the holes. An error from a target position is sensed by the position sensors and the error is corrected by deflecting the electron beam. Thus, the drilling can be effected while the X-Y table 4 is driven.

Figure 2:
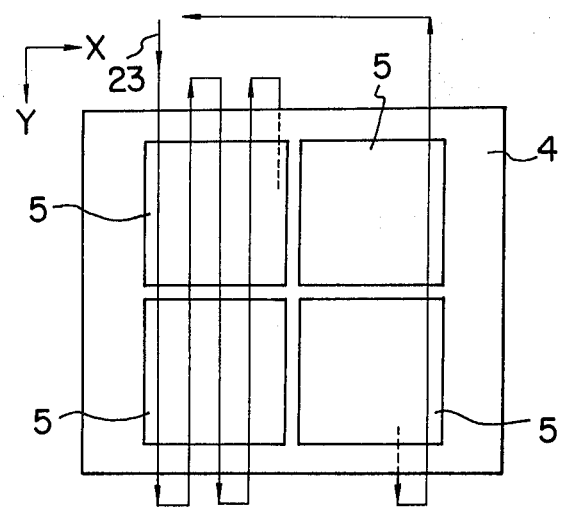
FIG. 2 shows a drive method of an X-Y table on which a substrate is mounted, in the electron beam drilling apparatus shown in FIG. 1.
Figure 3:
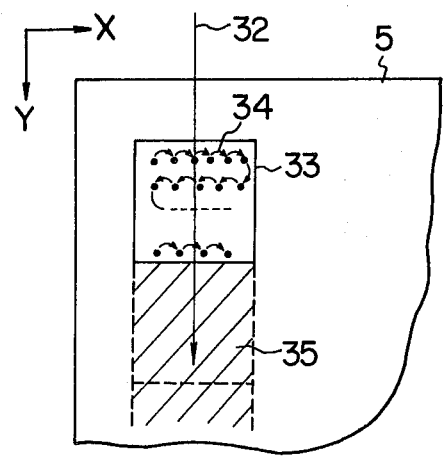
FIG. 3 shows a scan method of an electron beam, in the electron beam drilling apparatus shown in FIG. 1.

More specifically, referring to FIG. 2, the X-Y table 4 is controlled to reciprocate at a width over which the electron beam can scan so that the electron beam can scan over an entire surface of the substrate 5 mounted on the X-Y table 4. (In FIG. 2, a plurality of substrate 5 are mounted.) Numeral 23 denotes a moving path of the X-Y table 4. During the movement of the X-Y table 4, the electron beam is scanned by the deflection system in a scan order shown by 34 in FIG. 3 within a scan range 33. Thus, the electron beam can be scanned and positioned within a high precision positioning range. As the drilling in one scan range 33 is completed, the electron beam is scanned in the next scan range 35 to drill holes. Since the X-Y table 4 moves in the direction of 32 at a high speed, a number of holes can be drilled at a high speed. The X-Y table 4 need only be decelerated and accelerated at only corners of the moving path 23 shown in FIG. 2, it may be moved at a high speed in most portions of the drilling section.

However, in the drilling operation described above, since the positioning is effected by the deflection of the electron beam during the movement of the X-Y table 4, the following problems may be encountered when the beam deflection output is produced from the control computer 13 independently from the X-Y table 4.

(1) A displacement of a hole position due to a time difference between the setting of X and Y deflection values and the issuance of the electron beam pulse after the completion of the deflection.

(2) Deformation of a hole profile due to the movement of the X-Y table 4 during the issuance of the electron beam pulse.

When the electron beam is deflected under the condition of the electron beam deflection rate of 1 m/sec, and the maximum deflection width of 6 mm, the time difference between the deflection and the issuance of the pulse is 6 milliseconds. Accordingly, when the table moving speed is 100 mm/sec the maximum displacement of the hole position due to the time difference is 0.6 mm. In practice, the displacement is smaller than the value shown above because of limitations on hole-to-hole pitch and the table moving speed, but still the displacement amounts to several tens microns. This error is significant for an alumina substrate in which holes of 100 microns diameter are to be drilled at a hole-to-hole pitch of 250 microns.

Since the pulse duration is approximately 500 $\mu$-seconds, the X-Y table 4 is moved by approximately 50 microns during the issuance of the electron beam when the X-Y table 4 is moved at 100 mm/sec. As a result, the profile of the hole is deformed.

As seen from the above, if the current position of the X-Y table 4 is sensed by the control computer 13 and the X and Y deflection values are computed based on the sensed position to produce the electron beam pulse, a precision requirement is not met. It is, therefore, necessary to correct the deflection value of the electron beam from time to time as the X-Y table 4 moves.

To this end, the X-Y table 4 is provided with the position sensing system in the form of the encoders 8 and 9. Since the encoders 8 and 9 each produces an output pulse at a rate of one pulse/micron, the pulse interval is 10 $\mu$-seconds/pulse when the X-Y table 4 moves at 100 mm/sec. This speed is too high to follow by programming of the control computer 13 and hence an electron beam deflection correction system by a hardware as described below is required.

Figure 4:
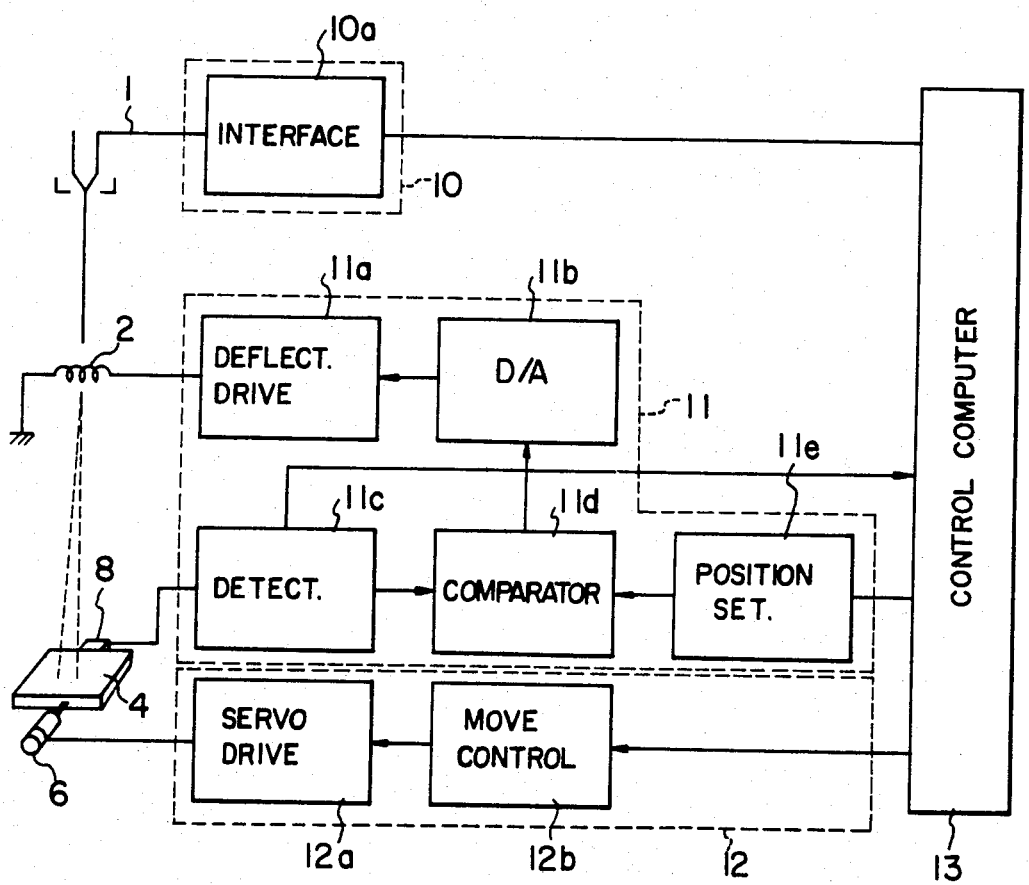
FIG. 4 shows a configuration for explaining a deflection control method of an electron beam.

FIG. 4 shows a configuration of the electron beam deflection control system. While two channels each including a deflection system (2, 11a–11e) and a servo motor system (6, 8, 12a, 12b) are used for the X-axis and the Y-axis, only one channel is shown in FIG. 4 for the purpose of simplicity of the explanation.

The X-Y table 4 is driven basically in the same manner as a conventional numeric control. The control computer 13 sets a movement quantity to the movement control circuit 12b and issues a movement instruction. The movement control circuit 12b produces a control signal to the servo system together with an acceleration/deceleration signal so that the servo drive circuit 12a drives the X-Y table 4 by the servo motor 6 and a tachogenerator attached to the servo motor 6.

The movement instruction from the control computer 13 is issued not to each one of the hole position but to the long path which extends across the substrate 5 as shown by the moving path 23 shown in FIG. 2. Accordingly, the X-Y table 4 is moved at the high speed during this period.

A feature of the present control system resides in that the X-Y table 4 is moved at the high speed and the position of the X-Y table 4 is sensed by the encoder 8 which is separate from the servo system, and the electron beam is generated while sensing the position of the X-Y table 4 to drill the holes. The control computer 13 previously stores therein the hole positions along the moving path of the X-Y table 4 shown in FIG. 2, and determines the timing of the next drilling by the output of the position detecting circuit 11c which indicates the current position of the X-Y table 4 based on the output of the encoder 8. When the X-Y table 4 moves to the next drilling position, the control computer 13 instructs the drilling position to the target position setting circuit 11e.

The setting of the target position setting circuit 11e does not always concide with the current position indicated by the output of the position detecting circuit 11c because the processing in the control computer 13 takes a certain time and the X-Y table 4 is moved at the high speed so that the output of the position detecting circuit 11c changes rapidly. Accordingly, for the deflection coil 2 for the moving direction of the X-Y table 4, a difference between the current position and the target position is calculated by the comparator circuit 11d and a correction is made in accordance with the resulting error to exactly position the electron beam to the target position. Since the present circuit is operated dynamically by the pulses from the encoder 8 even after the positioning has been completed, the positional error during the generation of the electron beam is avoided and a completely circular hole is drilled.

After the control computer 13 has sent the signal to the target position setting circuit 11e, the control computer 13 waits for a beam stabilization time period and then instructs to the beam generation circuit 10a to generate the beam.

After the positioning, drilling pulses for drilling holes of a diameter of 100 $\mu m\phi$ in the alumina substrate are preferably five pulses having an acceleration voltage of 120 kV and a pulse width of 50 $\mu$-seconds in order to improve the hole profile.

The present position error correction circuit dynamically corrects the error in the moving direction of the X-Y table 4, but the dynamic correction is not necessary in the direction orthogonal to the moving direction. However, in order to attain precise positioning without relying on the X-Y table drive system, the X and Y axes have the same circuit configuration and the position detection circuit in the moving direction is used only to detect the beam generation timing. Numeral 11a denotes a deflection coil drive circuit and numeral 11b denotes a D/A converter.

As described hereinabove, according to the present invention, the drilling speed for the substrate of the electronic equipment is materially increased.

The package density of the electronic equipment substrate has been recently increasing and a special substrate to which the present invention is applied need several tens thousands holes to be drilled.

For a given pattern which need ten thousands holes to be drilled, the drilling time in the prior art method in which the positioning is effected for each hole position and the drilling time in the present electron beam drilling method were compared. In the prior art system, the drilling time was 2000 seconds/substrate while the drilling time of the present embodiment was 12 seconds/substrate. Thus, the present embodiment was approximately 170 times as fast as the prior art system.

We claim:

1. An electron beam drilling apparatus, comprising:
 a moving member for carrying a workpiece;
 drive means for moving said moving member in at least one direction;
 detecting means for sensing a position of said moving member and for providing a position signal indicative thereof;
 a beam generator provided opposite to said moving member for generating an electron beam to drill holes in the workpiece;
 a deflection unit provided between said moving member and said beam generator for deflecting the electron beam so as to position the electron beam on a predetermined location of the surface of the workpiece;
 a computer for storing position data of the holes to be drilled and for determining a timing instruction for generation of the electron beam from the position signals of said moving member supplied by said detecting means and the position data of the holes;
 a target position setting circuit for storing the timing instruction supplied by said computer; and
 comparing means for comparing current position signals of said moving member from said detecting means with the timing instruction from said target position setting circuit and for supplying a deflecting instruction to said deflection unit so that the holes are drilled in the workpiece at a high speed with a high precision.

2. The electron beam drilling apparatus of claim 1, wherein said deflection unit comprises a first deflection member and a second deflection member, said first deflection member being arranged for deflecting the electron beam in a direction perpendicular to the direction of the movement of said moving member to scan the electron beam within a predetermined range and said second deflection member being arranged for deflecting the electron beam in a direction parallel to the direction of the movement of said moving member to correct a positional error of said moving member due to the movement thereof.

3. The electron beam drilling apparatus of claim 1, wherein said drive means comprises two drive motors for moving said moving member in orthogonal directions to enable scanning of the electron beam over a predetermined range.

4. The electron beam drilling apparatus of claim 1, wherein said beam generator generators five pulses having an acceleration voltage of 120 Kv and 50 $\mu$sec in width for drilling of the holes.

5. An electron beam machining apparatus, comprising:
 transfer means for moving a workpiece at a predetermined speed along at least a selected direction while the workpiece is machined;
 means for generating an electron beam and impinging the electron beam on the workpiece to machine the workpiece;
 deflection means provided between said transferring means and said beam generating means for deflecting the electron beam to control the positioning of the electron beam on the workpiece;
 means for detecting a position of the workpiece and providing position signals indicative thereof;
 means for determining a timing instruction for generation of the electron beam in response to the position signals; and
 comparing means for comparing the timing instruction with current position signals provided by said detection means and for supplying control signals to said deflection means for ensuring proper positioning of the electron beam on the workpiece.

6. The electron beam machining apparatus of claim 5, wherein said deflection means deflects the electron beam in orthogonal directions, one of the orthogonal directions being parallel to the selected direction.

7. A method of drilling holes in a workpiece by an electron beam, comprising the steps of:
 moving a workpiece at a predetermined speed at least along a selected direction;
 detecting a position of the workpiece while the workpiece is moved;
 storing position data of the holes to be drilled in a memory;
 determining a timing instruction for generation of the electron beam from signals of the position of the workpiece detected in the detecting step and the position data stored in the storing step;
 comparing the timing instruction with current position signals of the workpiece to provide a control signal;
 supplying the control signal to a deflection unit for controlling the electron beam; and
 generating the electron beam toward the workpiece for drilling the holes in the workpiece while the deflection unit controls the positioning of the electron beam on the workpiece.

8. A method according to claim 7, wherein the step of moving includes moving the workpiece at a speed of 100 mm/sec and the step of generating the electron beam toward the workpiece includes generating five pulses having an acceleration voltage of 120 Kv and 50 $\mu$sec in width for drilling of the holes.

* * * * *